Dec. 30, 1958  J. J. MANNING  2,866,395
CAMERA APPARATUS ESPECIALLY ADAPTED FOR THE
PHOTOGRAPHIC IDENTIFICATION OF HORSES
Filed April 6, 1956  3 Sheets-Sheet 1

INVENTOR
JAMES J. MANNING
BY
ATTORNEYS

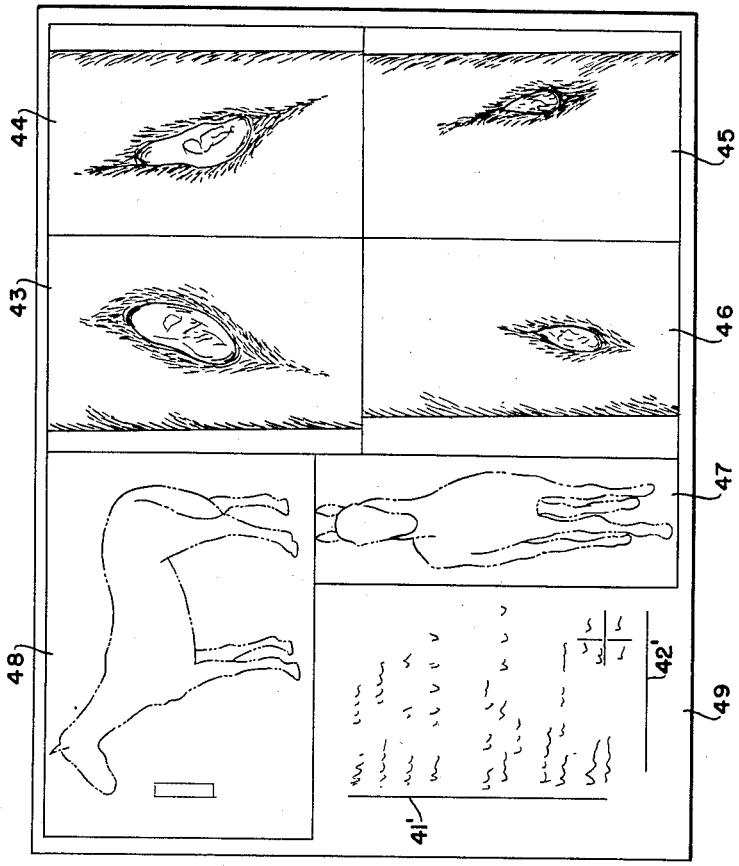

United States Patent Office 2,866,395
Patented Dec. 30, 1958

2,866,395

CAMERA APPARATUS ESPECIALLY ADAPTED FOR THE PHOTOGRAPHIC IDENTIFICATION OF HORSES

James J. Manning, Floral Park, N. Y.

Application April 6, 1956, Serial No. 576,666

7 Claims. (Cl. 95—11)

The present invention relates to photographic apparatus, and more particularly to an improved camera apparatus having novel structural features especially adapting the equipment for use in connection with a novel method of identifying thoroughbred race horses.

Reliable identification of horses is an important problem in pari mutuel racing, for example, to prevent the entry of race horses under false names to capitalize on favorable betting odds. Likewise, proper identification is important in breeding, to guarantee the identity of the sire and dam of a foal, and to insure against theft and substitution of valuable thoroughbred horses. A system of lip tattoos has failed to solve the problem of positive identification because such tattoos are subject to alteration and in time become indistinct; and perhaps more important, such tattoos are subject to duplication in a number of horses of similar outward appearance. It has now been recognized that a horse may be positively identified by the "chestnuts" or small growths which appear at the inside of each leg of the horse, slightly above the knee. After the horse is about a year old, the chestnuts remain unchanged in their distinctive size and shape, and my experimental studies have shown that the chestnuts of a horse have characteristic units of design or patterns, such as arcs, peaks, points, and plateaus, analogous to loops, arches, and whorls, which are the design units of the human fingerprint system.

My experimental studies have also shown that a practical and workable horse-identification system for such large-scale activities as pari mutuel racing may be based on the distinctive and identifying features or characteristics of the chestnut growths of a horse. In the system I have developed, the four chestnuts of a horse are photographed at exactly one-third actual size. The photographs thus taken are enlarged and grouped together at one side of a composite photograph. On this same composite, photographs of the horse in front and profile views also appear. Along with these photographs, is a photograph of an identification card containing such information as the name of the horse, the track at which the photographs were taken, and such identifying characteristics as color, sex, and distinguishing body marks. After the identification card is prepared, a photograph is taken thereof at one-third actual size by means of the same apparatus used in photographing the chestnuts of the horse. This original photograph of the identification card is then enlarged three times in the same apparatus used in enlarging the chestnut photographs. The card includes a line or other object of known dimensions, and in the completed composite photograph the image of this line or object may be measured to determine if its dimensions are the same as those of the known line or object on the actual card. If such is the case, then it is assured that the chestnut photographs, as they appear in the composite, are accurate, actual-size representations of the chestnuts of the horse. This follows, since the identification card and the chestnuts are photographed, and then reproduced, by the same apparatus and with the same procedures. Moreover, this arrangement assures complete standardization of all records, so that records prepared at one track or location are standardized with respect to records prepared at different locations with different equipment.

From the actual-size photographs, appearing in the composite photographic records, the chestnuts of the horse may be studied and classified according to their characteristic features. In this respect, I have developed a classification system which includes twenty-six separate shape classifications. Each such classification may be designated by a letter of the alphabet, and the identification record of the horse will include a description of its chestnuts by such a letter. In addition, one of the characteristic features of a chestnut is its size, and this is readily determined in my system by measuring the planar area of the chestnut from the actual-size photograph, using an ordinary planimeter. Each chestnut may therefore be further described by a number representing area units, as determined by the planimeter measurements. Thus, in the identification record, each chestnut of the horse is described by a letter and a number.

The effective operation of an identification system of the type described, for large-scale operations such as pari mutuel racing, depends largely on the ability to take the necessary chestnut photographs quickly and accurately. The photographs must be taken rapidly, often under adverse lighting conditions, and in such manner as not to disturb or frighten a high-strung horse. Moreover, it is necessary that the camera be accurately positioned before taking the photograph in order to insure that the exact desired reduction in size is effected when the photograph is taken.

The present invention provides a novel and improved camera apparatus having improved features adapting it especially for the photographing of the chestnuts of a horse, for the purpose of preparing an identification record for the horse, or for establishing the identity of the horse from previous records on file. The new camera apparatus includes a camera mounted in a novel frame structure having means for insuring the proper positioning of the camera with respect to the leg of a horse, so that a photograph may be taken in the desired manner. In addition, the arrangement of the camera and frame structure is such that the apparatus may be placed firmly against the leg of a horse when taking a photograph, so that relative movement between the camera and leg during the exposure period is virtually eliminated. The new apparatus also includes a light source and a high-voltage power supply therefor which provides the proper illumination for the taking of a photograph, and suitable means are provided for insulating the horse from the apparatus to avoid the possibility of subjecting the horse to electrical shock during the taking of a picture.

In modified forms of my new apparatus, means are provided for automatically energizing the light source and tripping the camera when the apparatus is properly positioned against the leg of a horse. Another modification includes means to mount a small identification tag in the exposure field of the camera so that each chestnut photograph includes an image of such identification tag with the name of the horse thereon. This avoids possible confusion when a large number of photographs are taken.

For a better understanding of the invention, reference should be made to the following description and accompanying drawings, in which:

Fig. 4 is a plan view, with parts broken away, of a combined identification card and tag used in connection with my new identification system and with the camera apparatus of Fig. 1;

Fig. 5 is a plan view of a composite photographic record incorporating photographs taken with the apparatus of Fig. 1;

Figure 1:
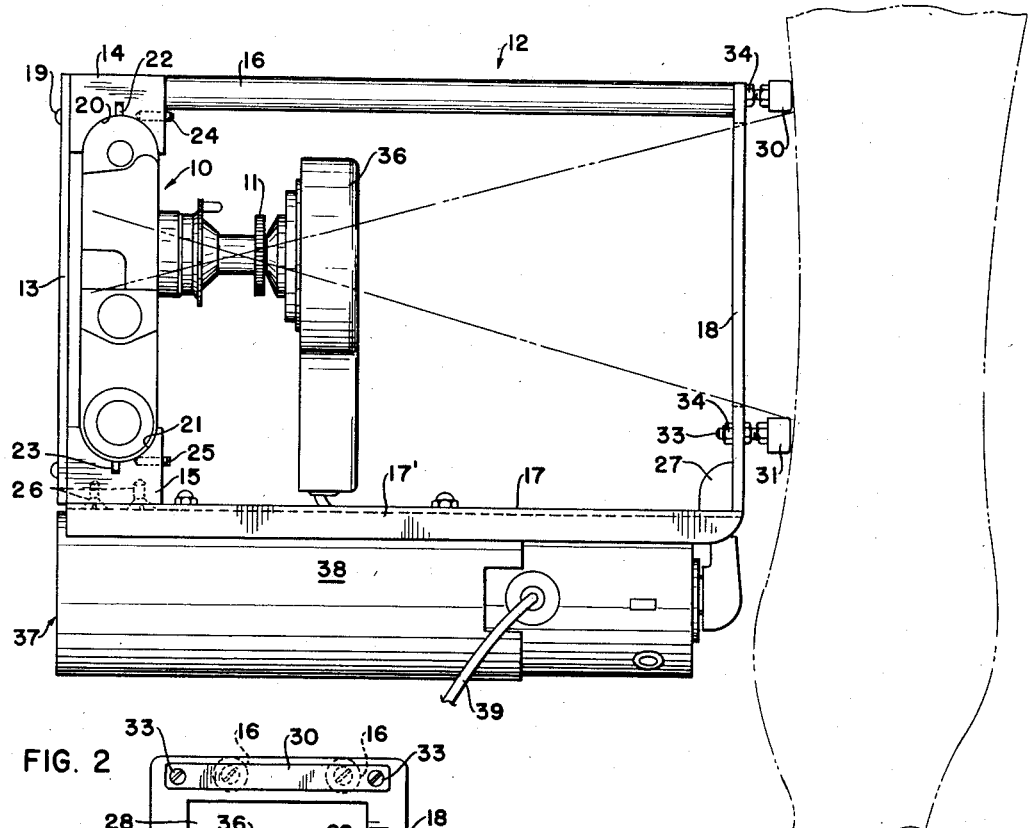
Fig. 1 is a side elevation of the new camera apparatus, showing the apparatus held against the leg of a horse, in position for taking a photograph.
Figure 2:
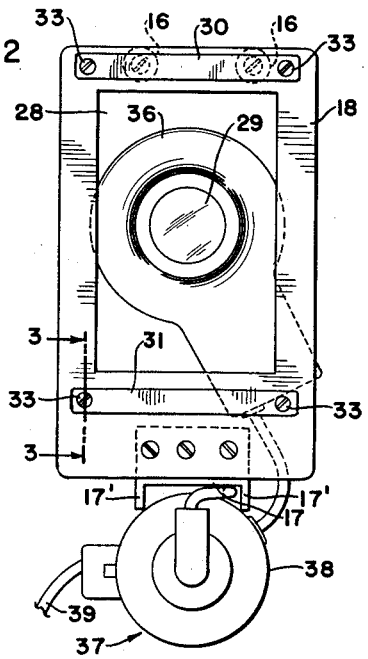
Fig. 2 is a front elevation of the camera apparatus of Fig. 1.

Referring initially to Figs. 1 and 2, the numeral 10 designates generally a camera which, in the illustrated and preferred form of the invention, is a "Leica," 35 mm., model IF, IIF, or IIIF, fitted with a 50 mm. "Elmar" close-up lens, the latter being indicated generally by the reference numeral 11. The camera 10 is mounted in a frame structure 12 which includes a back plate 13, camera mounts 14, 15, spacer elements 16, a spacing member 17, and a front plate 18. In the position in which the new camera apparatus is normally used, the back plate 13 is vertically disposed, and the camera mounts 14, 15 are secured to the plate 13 at its upper and lower ends, respectively, by means of suitable screws 19, for example. The camera mounts 14, 15 have inwardly facing semicylindrical recesses 20, 21 and slots 22, 23 for closely receiving the end portions of the camera body. The camera is slidably received in the mounts 14, 15 and is removably secured therein in a fixed position by means of set screws 24, 25. The camera 10 is so positioned that its lens opening, not specifically shown, is directed outwardly from the back plate 13.

Secured to the upper camera mount 14, and extending forwardly therefrom, are parallel spacer elements 16, which are preferably hollow tubular members of relatively light weight. In the illustrated apparatus, the spacer elements 16 are rigidly secured to the camera mount 14. However, the invention contemplates that means may be provided for adjustably receiving the spacer elements 16 in the mount 14.

A spacer element 17, which is preferably in the form of a channel having downwardly projecting flanges 17', is rigidly secured to the lower camera mount 15 and extends forwardly therefrom. In the illustrated apparatus, the lower spacer element 17 is rigidly secured to the camera mount 15 by means of screws 26, for example. However, the spacer element 17, as well as the upper spacer element 16, may be mounted for adjustable movement with respect to the camera mounts in desired cases.

At the forward ends of the spacer elements 16, 17 is secured the front plate 18. The plate 18 is secured directly to the ends of the upper spacer element 16 by suitable screws, not shown, and is secured to the lower spacer element 17 by means of a filler block 27 which engages both the plate 18 and the spacer element 17. The front plate 18 is parallel to the back plate 13, and will be vertically disposed when the camera apparatus is in position for use in the usual manner.

As shown in Fig. 2, the front plate 18 has a large rectangular opening 28 positioned directly in front of the lens opening 29 of the camera 10. The opening 28 is centered about the focal axis of the camera 10, and serves to define a predetermined view area through which a film exposure may be made. The front plate 18 thus functions as a mask, affording a limited exposure area at the front of the apparatus.

Figure 3:
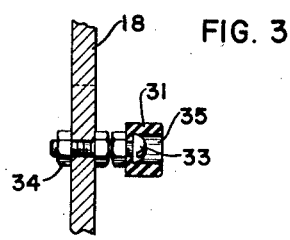
Fig. 3 is an enlarged fragmentary sectional view taken generally along line 3—3 of Fig. 2.

Secured to the masking plate 18 and extending forwardly therefrom are spaced bumpers 30, 31. As shown in Fig. 2, the bumpers 30, 31 are mounted immediately above and below the exposure opening 28 in the plate 18 and extend transversely of the plate, terminating within the peripheral limits thereof. In accordance with the invention, the bumpers 30, 31 are formed of insulating material, such as plastic or hard rubber, and are adjustably secured to the masking plate 18 by a plurality of bolts 33 and nuts 34, substantially as indicated in Fig. 3. The bumpers 30, 31 are recessed, as at 35, so that the heads of bolts 33 lie totally within the insulating material. Thus, when the bumpers 30, 31 are placed against the leg of a horse, as shown in Fig. 1, the horse is insulated from the camera apparatus.

The camera and lens assembly 10, 11 of the suggested make and model, when focused at infinity, has a nominal focal distance of 67 mm. between its focal plane and the plane of the film. Accordingly, in order to photograph an object lying in the plane defined by the front surfaces of bumpers 30, 31 at an exact three-to-one reduction ratio, the distance from such plane to the focal plane of the camera assembly must be exactly three times the distance from the focal plane to the plane of the film within the camera. The parts are thus proportioned in such manner that the focal plane of the camera assembly lies 201 mm. from the plane defined by the front surfaces of the bumpers 30, 31. However, it is often true that the actual focal length of the camera and lens assembly 10, 11 will vary somewhat from the nominal length of 67 mm., due to variations arising in the manufacture of the equipment. Accordingly, the bumpers 30, 31 may be adjusted toward or away from the camera so that an exact 3:1 ratio may be established. Such adjustments as may be necessary are made immediately after assembly of the camera and frame, so that the apparatus is properly adjusted for the particular camera utilized therein. The apparatus, having once been properly adjusted or calibrated, requires no further adjustment, of course, since the focal distance of the camera does not change.

In order to effectively photograph the chestnuts of a horse, the photographs must be taken quickly, and in many cases under poor lighting conditions. Accordingly, the new camera apparatus includes a light source 36 which may advantageously be of the type sold under the trade name "Mighty Midget." The recommended light source 36 has a circular lighting element which is adapted to be attached to the camera 10 in such manner as to surround the lens opening thereof. When the light source 36 is energized, light is cast outwardly through the opening 28 in the masking frame to illuminate the subject to be photographed.

In order to provide for a relatively great depth of focus, it is desirable that the light provided by the source 36 be relatively intense, so that the lens opening of the camera 10 may be as small as practicable. In this respect, I prefer an f/22 opening. This gives the greatest possible depth of focus for the recommended make and model of camera, and assures that all parts of the horse's leg will photograph in good detail, even though the contours of the leg are such that parts thereof lie outside of the plane defined by the bumpers 30, 31.

To energize the light source 36 I employ a condenser discharge power source 37, housed in a tubular casing 38. The casing 38 is bolted or otherwise secured to the channel member 17 forming the lower spacer element of the frame structure. As shown in Fig. 2, the depending flanges 17' of the channel 17 engage the side walls of the casing 38 to provide a firm support for the casing. A power cord 39 leads from the casing 38 to a suitable battery, not shown, which may be carried about by the person using the camera apparatus. During periods of non-use of the apparatus the condensers of the power supply 37 become charged, and when the camera is tripped the condensers are discharged through suitable coils coupled with the light source 36 to energize the latter. In this respect, it will be understood that charges of as much as several thousand volts are developed by the power supply 37 for the purpose of energizing the light source 36. For this reason, it is important that adequate insulation be provided to prevent the possibility of the horse being subjected to an electrical shock.

In using the apparatus of Figs. 1–3, the camera 10 is loaded with film and inserted in the camera mounts 14, 15. The various settings of the camera are set and preferably locked in place to avoid the possibility of error. When the power supply 37 is charged, the apparatus may be placed in a position where the bumpers 30, 31 are pressed against the horse's leg, respectively above and below the chestnut thereon, so that the chestnut is substantially centered within the opening 28 of the masking plate 18. Preferably, the bumpers 30, 31 are urged firmly against the horse's leg, since it has been found that the horse has a greater feeling of safety when such firm pressure is used.

As soon as the bumpers are properly positioned and pressed against the horse's leg, the camera 10 is tripped, and simultaneously therewith the light source 36 is energized. The entire operation takes but a few seconds, and my experimental tests have shown that even the most high-strung horse does not fear the apparatus. The insulated bumpers 30, 31, of course, protect the horse from shock during the energization of light source 36, so that the actual taking of the photograph does not frighten the horse. Moreover, in this respect, by positioning the light source 36 at the front of the camera and close to the horse's leg, the flash of light is relatively confined and is probably unnoticed by the horse.

After the first photograph has been completed, a few seconds is required for the recharging of the condenser power supply 37, and during this period of time the camera is reset to bring an unused frame of the film into position for exposure. Preferably, the camera 10 is of a type which cannot be reset until an unused frame of film is moved to the exposure position. This prevents double exposures, and facilitates the use of apparatus by relatively unskilled persons.

After the few seconds required for resetting the camera and recharging the power supply 37, a second photograph may be immediately taken. Generally, the photographs should be taken in a definite order to avoid any possible confusion in the subsequent processing and reproduction of the photographs. I have found that in most cases the four chestnuts of a horse may be photographed in a few minutes, using my improved apparatus.

In my improved identification system, I also utilize the camera apparatus to photograph an identification card of the type shown in Fig. 4, which contains the name of the horse as well as certain important identifying characteristics thereof. The identification card, indicated generally by the numeral 40, is provided with one or more marks 41, 42 of known dimensions which are useful in determining the accuracy of the photographic processes employed in my system. Thus, the card 40 is photographed by placing the bumpers 30, 31 of the new camera apparatus against the front surface of the card and actuating the camera and light in the usual manner. If the camera apparatus is in proper adjustment, the photograph of the card 40 will be a substantially exact 3:1 reduction, as are the photographs of the chestnuts of the horse. At a subsequent time, a composite photograph of the type shown in Fig. 5 is prepared.

In the composite, grouped at one side thereof, are photographs 43—46 of the four chestnuts of the horse, reproduced from the original photographs thereof, and enlarged exactly three times. The composite also includes front and profile views 47, 48 of the horse, and a reproduction 49 of the identification card 40 made from the original photograph thereof and enlarged exactly three times.

Where all the photographic equipment employed is in proper adjustment, the reproduction of the card 40 as well as those of the chestnuts, will be substantially exactly actual size. This may readily be determined by measuring the lines 41', 42' appearing in the enlarged photographic reproduction of the identification card 40. If these lines are equal in length to the lines 41, 42 of the original card, plus or minus a small permissible tolerance, it may be assumed that the photographic reproduction of the chestnuts are accurate actual-size representations.

The completed composite photograph, as shown in Fig. 5, forms a complete identification record for the horse, and may be reproduced where necessary so that the identification files of race tracks and similar establishments may be readily maintained in an up-to-date condition. The chestnut photographs also facilitate the measurement and classification of the chestnuts of the horse, and the information thereby derived, along with other pertinent information, may be readily translated onto a punch-card, for example, so that conventional automatic business machines may be employed in desirable cases in the identification system.

Figure 6:
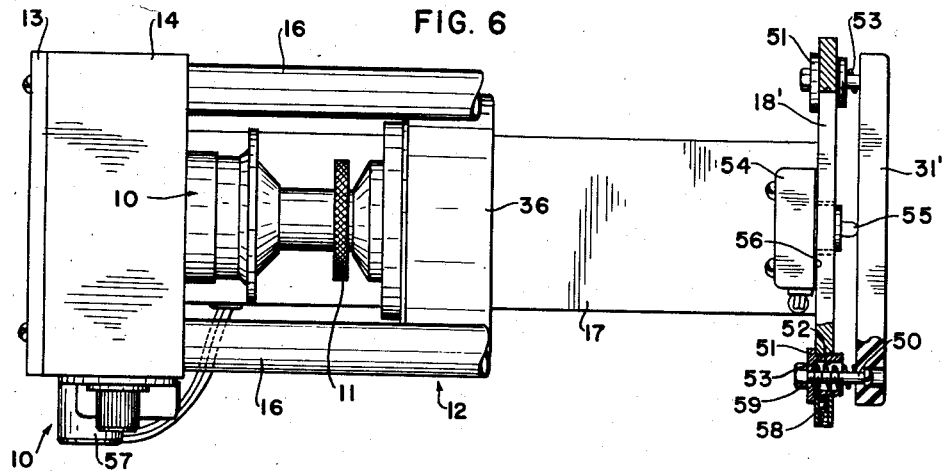
Fig. 6 is a top plan view, with parts broken away, of a modified form of the apparatus of Fig. 1.

In Fig. 6 a slightly modified form of the new camera apparatus is illustrated. In the modified apparatus, one or more of the bumpers (bumper 31' in the illustration) is movably mounted on a masking plate 18' at the front of the frame structure. In the illustrated apparatus, the bumper 31' is slidably received upon spaced adjustable bolts 50. The bolts 50 are in turn received in adjustable fittings 51 having recesses 52 therein for the reception of springs 53. The springs 53 normally urge the bumper 31' outwardly of the masking plate 18' to the full extent permitted by the bolts 50.

In the center portion of the masking plate 18' is mounted a switch 54 having an operator 55 projecting through the plate 18' and bearing against the bumper 31'. The switch 54 is of a type adapted for actuation upon a relatively minute movement of the operator 55. Suitable means may be provided for adjusting the position of the switch 54, and in the illustrated apparatus appropriate shims 56 may be inserted between the casing of the switch 54 and the plate 18' for this purpose.

With the modified apparatus of Fig. 6, when the bumper 31' is pressed firmly against the leg of the horse, the bumper is pressed against the front surfaces of the fittings 51. When the bumper thus moves inwardly it depresses the switch operator 55 to actuate the switch 54, thereby energizing the light source 36 and tripping the camera 10, through a suitable solenoid actuator 57 of a type well known in the art. The photograph is thus automatically taken when the apparatus is brought into proper position against the leg of the horse.

In order to insure that photographs taken with the apparatus of Fig. 6 will be reduced at a substantially exact 3:1 ratio, the initial calibration of the apparatus will involve the proper adjustment of the switch 54 so that the front surface of the bumper 31' will lie in the desired plane at the moment the switch 54 is actuated. Suitable adjustment of the fittings 51 is also provided for, so that fixed abutment surfaces are provided to limit the movement of the bumper 31'. The fittings 51 should be so adjusted that the bumper 31' is permitted to move only slightly past the point at which the switch 54 is actuated. The bolts 50 may then be appropriately adjusted so that the bumper 31' will normally lie slightly outside the point at which the switch 54 is actuated. Suitable means, such as locking screw 58 and nut 59, are provided for securing the various parts in their adjusted positions.

Figure 7:
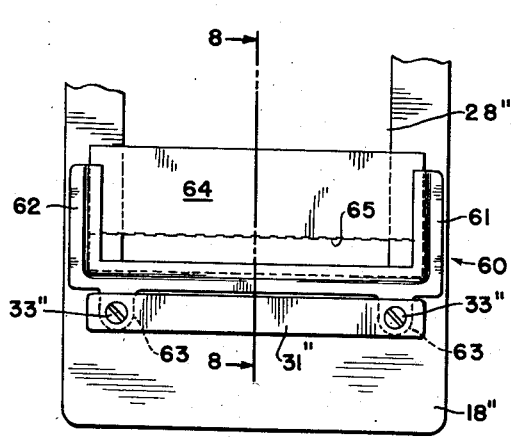
Fig. 7 is a fragmentary front elevation of another modified form of the apparatus of Fig. 1.
Figure 8:
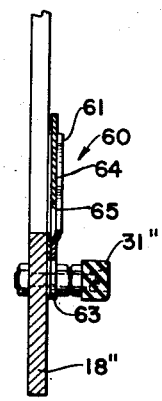
Fig. 8 is a fragmentary cross-sectional view taken along line 8—8 of Fig. 7.

In the modified apparatus of Figs. 7 and 8, the masking plate 18'' at the front of the frame structure mounts a tag receiving frame 60 adjacent the lower portion of the frame opening 28''. The tag frame 60, in the illustrated apparatus, is generally U-shaped, and has vertically extending leg portions 61, 62. The lower portion of the frame 60 has integral portions 63 adapted to receive bolts for securing the frame to the masking plate 18''. In the illustrated apparatus, bolts 33'' used to secure the lower bumper 31'' are also utilized to secure the tag frame 60. The frame 60 is such that an identification tag 64 may be inserted therein from the top, substantially in the manner shown, so that one surface of the card faces the camera and is exposed to the field thereof. It is contemplated that the tag 64 will contain such pertinent information as the name of the horse, the date, and the track. The tag 64 will be inserted in the frame 60 before photographing the chestnuts of a horse, so that each chestnut photograph will include the visual portion of the tag. This avoids possible confusion and error when a large number of photographs are taken at one time.

Preferably, the tag 64 forms the upper portion of the identification card 40 of Fig. 4, and is attached thereto along a perforation line 65. Thus, it will be convenient to fill in the tag 64 simultaneously with other portions of the card 40 to provide the pertinent information, after which the tag 64 is detached from the card and inserted in the tag frame 60. As will be readily understood, when the tag 64 is held in the frame 60 it will be slightly out of the plane of focus as defined by the front surfaces of the bumpers. However, since the depth of focus of the camera 10, adjusted in the recommended manner, is quite great, the tag 64 is sufficiently in focus to be easily read, and the fact that the final reproduction of the tag 64 may be somewhat greater than actual size is of no importance.

In some cases it may be desirable to provide a mark 64' of known dimensions on the identification tag 64, so that each chestnut photograph has its own standardization indicia. In this event, appropriate compensation will be made for the fact that the tag 64 is positioned slightly inside of the plane defined by the bumpers.

For use at race tracks, for example, the new camera apparatus may advantageously include a "Polaroid Land Camera," or equivalent device capable of providing a finished photograph in a short time, without the use of darkroom facilities. In such cases, the camera and frame are arranged to photograph at a 1:1 ratio, whereby an actual size photograph is provided. This form of the apparatus may be advantageously employed immediately prior to and/or following a race to avoid the possibility of substitution of horses between the stable and paddock or between the paddock and starting gate. Likewise, this apparatus may be used to prevent substitution of horses after a race, before the usual tests are made to determine whether a horse has been drugged. In any instance where there is reason to suspect the substitution of horses, an actual-size photograph of one or more chestnuts may be taken on the spot and compared with the official track records to quickly verify the identity of a horse.

The new apparatus is a compact, lightweight, and wholly practical device which may be conveniently used in my improved horse-identification system. The apparatus is rugged, simple to use, and convenient to carry from place to place so that persons with relatively little skill in the photographic art may take large numbers of photographs with the accuracy and quality required in effectively carrying out the improved system.

As one of its important features, the new apparatus includes a light source positioned so as to be close to the leg of the horse when a photograph is taken and energized by a high-voltage power supply so that a brief but intense illumination is provided. The arrangement minimizes the possibility of frightening a horse by the flash of light and at the same time improves the definition of the resulting photograph by permitting the use of a small lens opening. The apparatus includes means to insulate the horse from the frame structure so that the possibility of subjecting the horse to electrical shock is effectively avoided.

It should be understood, however, that certain alterations or variations may be made in the specific apparatus illustrated and described without departing from the clear teachings of the invention. Reference should therefore be made to the following claims in determining the full scope of the invention.

I claim:
1. A camera apparatus especially adapted for use in a system for the photographic identification of horses comprising a camera, a frame structure, means at one end of said frame structure for rigidly but removably mounting said camera with the lens opening thereof directed toward the other end of said frame structure, a masking plate rigidly mounted at the said other end of said frame structure and having an opening of predetermined size and shape in front of said lens opening, a light source carried at the front of said camera and adapted when energized to direct light through the opening in said masking plate, a high-voltage power supply for said light source, a housing for said power supply mounted on said frame, a plurality of bumpers of insulating material secured to said masking plate and extending forwardly therefrom, and means to adjust the position of said bumpers relative to said camera.

2. The camera apparatus of claim 1, further characterized by said frame structure including a channel member forming the bottom portion of said frame structure and extending to the bottom of said masking plate, said channel member having downwardly projecting flanges, and said housing comprising a tubular casing secured to said channel member with the side walls of the housing engaged by the flanges of the channel.

3. The camera apparatus of claim 1, further characterized by said means to adjust the position of said bumpers comprising means to adjustably secure said bumpers to said masking plate.

4. The camera apparatus of claim 1, further characterized by said bumpers comprising elongated members of insulating material mounted adjacent the top and bottom of the opening in said masking plate and defining a plane spaced a predetermined distance from the focal plane of said camera.

5. A camera apparatus especially adapted for use in a system for the photographic identification of horses comprising a camera, a frame structure, a pair of mounting blocks at one end of said frame structure for rigidly but removably securing said camera with the lens opening thereof directed toward the other end of said frame structure, a plurality of spacer elements of predetermined length secured to said mounting blocks and extending forwardly therefrom, a masking plate carried by the forward ends of said spacer elements and having an opening therein of predetermined size and shape disposed in front of said lens opening, a light source carried in fixed relation to said camera and directed forwardly toward the opening in said masking plate, a high-voltage power supply for said light source, a housing for said power supply secured to said frame structure, and insulating means projecting forwardly of said masking plate and having forward surface portions defining a plane spaced a predetermined distance from the focal plane of said camera.

6. A camera apparatus especially adapted for use in a system for the photographic identification of horses comprising a camera, a frame structure, means at one end of said frame structure for rigidly but removably mounting said camera with the lens opening thereof directed toward the other end of said frame structure, said frame structure including spacer elements extending forwardly of the camera, a masking plate mounted at the forward ends of said spacer elements and having an opening of predetermined size and shape disposed in front of said lens opening, bumper means carried by said spacer elements and forming bumper surfaces spaced forwardly of said masking plate, said bumper surfaces defining a plane spaced a predetermined distance from the focal plane of said camera, said bumper means including means to insulate said bumper surfaces from said frame structure, a light source carried in fixed relation to said camera, a high-voltage power supply, and a housing for said voltage supply secured to said frame structure.

7. The camera apparatus of claim 6, further characterized by said bumper means including a movable member, and further including a switch actuated by movement of said movable member for effecting a film exposure.

References Cited in the file of this patent

UNITED STATES PATENTS

| | | |
|---|---|---|
| 1,266,443 | Folmer | May 14, 1918 |
| 1,808,118 | Peterson | June 2, 1931 |
| 1,839,893 | Pierce | Jan. 5, 1932 |
| 2,106,606 | Kasanjian | Jan. 25, 1938 |
| 2,185,508 | Kunze | Jan. 2, 1940 |
| 2,322,032 | Kunze | June 15, 1943 |
| 2,403,892 | McFarlane | July 9, 1946 |
| 2,682,603 | Dine | June 29, 1954 |